United States Patent Office 3,228,494
Patented Jan. 11, 1966

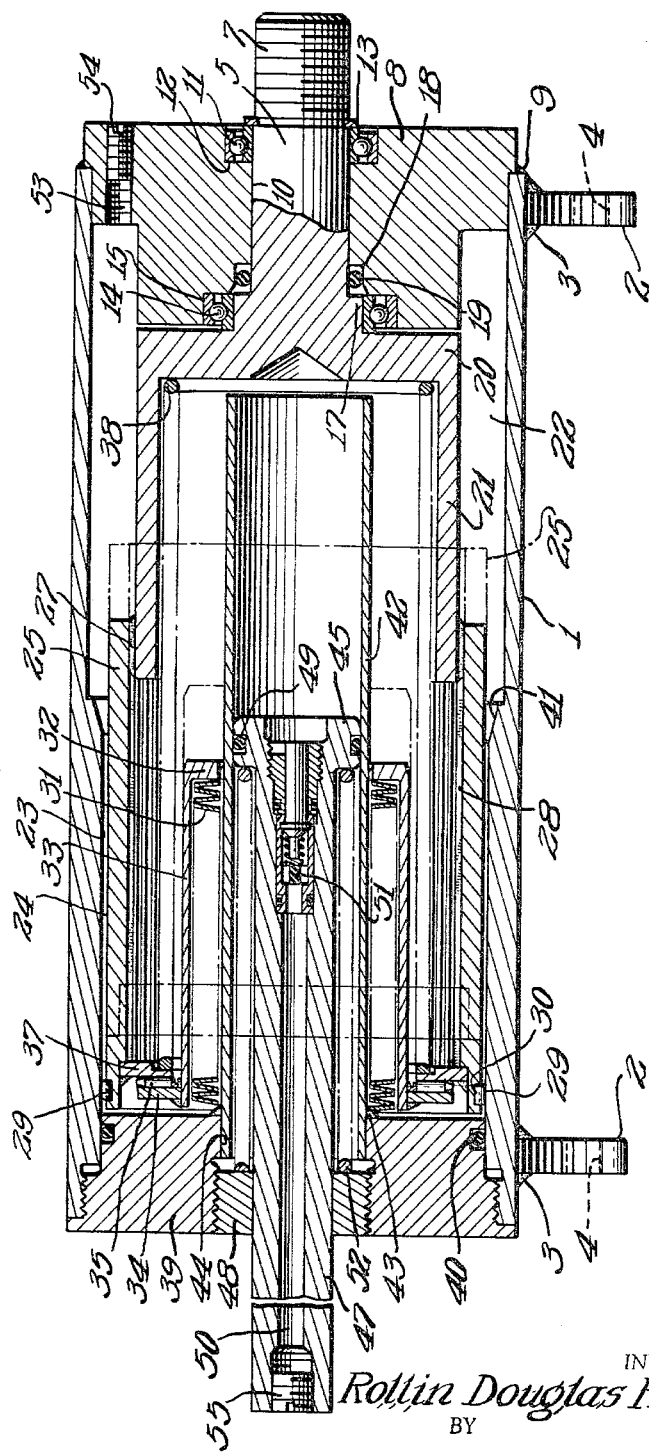

3,228,494
TEMPERATURE COMPENSATED VISCOUS
SHEAR ROTARY DAMPER
Rollin Douglas Rumsey, Buffalo, N.Y., assignor to Houdaille Industries, Inc., Buffalo, N.Y., a corporation of Michigan
Filed Feb. 27, 1964, Ser. No. 347,772
8 Claims. (Cl. 188—90)

This invention relates to improvements in rotary dampers and more particularly concerns such dampers operating on the principle of resistance to relative rotary motion of closely spaced surfaces having therebetween a viscous liquid which resists relative rotary motion of the surfaces and thereby damps flutter and the like in apparatus with which the damper is used.

Prior viscous shear dampers utilizing, for example, silicone fluid, have a damping characteristic proportional to the viscosity of the fluid. As a result, where large temperature ranges are encountered, such as in aircraft, military equipment, and the like, wide variations in damping characteristics are encountered. Using average room temperature of about 72° F. as a control temperature, such a viscous damping fluid will average about 50% inefficient at 160° F., as compared to room temperature efficiency, and about 200% as efficient at minus 65° F., or even higher, depedent upon shear rate since the silicone is thixotropic fluid. For many purposes, such a wide variation in damping characteristic is not acceptable. Frequently, heating devices or blankets have been employed to maintain the damper at reasonably constant temperature.

Some efforts have been made heretofore to effect temperature compensation in viscous shear dampers by changing the width of the gap or shear film spacing between the opposing relatively moving surfaces. Inasmuch as the shear rate on the viscous damping fluid reduces as the gap is increased, the effective viscosity increases due to the thixotropic nature of the material, substantially defeating the intent. Hence, relatively slight change in damping is achieved by gap changing and that expedient has been found ineffective to accomplish temperature compensation.

Accordingly, it is a principal object of this invention to provide new and improved temperature compansation of viscous flutter dampers according to which the shear film gap is not deliberately altered, but the area of viscous fluid in shear is varied as a function of temperature.

Another object of the invention is to provide a new and improved temperature compensated viscous shear rotary damper construction in which substantially uniform damping is attained over a full range by temperature-related changes in shear area.

A further object of the invention is to provide a new and improved viscous shear rotary damper in which mechanical friction resistances are maintained as low as practicable by a novel relationship of anti-friction bearings and extremely limited seal drag between relatively rotary parts.

Still another object of the invention is to provide a new and improved rotary damper in which by avoidance of close tolerances between relatively rotary components possible failures due to galling are prevented.

Yet another object of the invention is to provide a novel viscous shear rotary damper capable of continuous rotation.

A still further object of the invention is to provide a new and improved viscous shear rotary damper of the highest reliability resulting from numerous desirable features including minimum seals, advantageous use of anti-friction bearings, wide tolerances and clearances and the ability to utilize a highly stable viscous damping fluid.

Other objects, features and advantages of the present invention will be readily apparent from the following detailed description taken in conjunction with the accompanying drawing, in which:

The single figure depicts a representative embodiment of the present invention in a temperature compensated viscous shear rotary damper and comprises a longitudinal generally diametrical sectional detail view therethrough.

One of many uses for a temperature compensated viscous shear rotary damper as illustrated is as a flutter damper in aircraft, and more particularly to eliminate flutter in the relatively movable control surfaces in the wing and tail assemblies. For this purpose, the damper unit is provided with a housing 1 of preferably elongated tubular structure provided with suitable means such as mounting fins or lugs 2 adjacent to its opposite ends and in this instance integrally rigidly secured thereto as by means of welding 3 where both the housing and the lugs are made of steel. Thereby the unit is adapted to be secured to the frame structure of a relatively stationary part of the apparatus with which used such as part of an aircraft, as by means of bolts (not shown) extending through bolt holes 4 provided in the mounting lugs 2.

Damping means enclosed within the housing 1 comprise an efficient assembly of components which are economically constructed as essentially circular, tubular and cylindrical configurations which can be economically manufactured and easily assembled without critical attention to relative torsional dispositions or tolerance requirements for fit, but in which symmetry in assembly is achieved by the mere appropriate interengagement of parts and liberal tolerance spacings are a virtue. For operatively connecting the internal damper mechanism with a relatively movable part of the associated apparatus, such as a control surface component of an aircraft, a shaft 5 has an outer end portion 7 which may be threaded as shown for attachment to said relatively movable part and projects to a suitable extent outwardly from a closure end cap member 8 secured to the adjacent end portion of the tubular housing 1. In this instance, the end cap member 8 has a rabbeted perimeter telescopically seated on and in the adjacent end portion of the housing member 1 and permanently and fluid sealingly secured thereto as by means of welding 9 where the end cap member is also made of steel.

Stabilized anti-friction mounting of the shaft 5 within an axial bore 10 through the substantially elongated end cap member 8 is effected by bearing means such as a ball bearing assembly 11 mounted in a suitable rabbet groove 12 adjacent to the outer end of the bore 10 and retained by suitable means such as a retainer ring 13 mounted on the shaft. At the inner end portion of the end cap 8 a larger diameter bearing comprising a ball bearing ring assembly 14 mounted in a rabbet groove 15 in the end cap member engages about a larger diameter concentric bearing hub 17 provided intermediately on the shaft 5 and providing an outwardly facing shoulder opposing a seal-containing rabbet groove 18 at the inner end of the shaft bore 10 and within which is mounted a sealing O-ring 19. This O-ring 19 thus provides the seal against egress of fluid from within the working chamber defined within the housing 1 past the shaft 5 and affords minimum frictional resistance to rotations of the shaft 5 which is mounted in highly stable anti-friction rotary relation in the end cap member 8 by means of the differentially sized ring bearings 12 and 14.

Within the working chamber of the housing 1 a viscous shear film torsional damper coupling is afforded for the rotary shaft 5. To this end, the inner end portion of the shaft is constructed as an enlarged diameter head 20 which opposes the inner end of the end closure member 8 in slightly spaced relation as maintained by, for example, the inner race of the ball bearing assembly 14 and provided with an elongated inwardly extending concentric cylindrical marginal flange 21 affording a generally cup-shaped configuration and disposed in substantially radially spaced relation to the surrounding inner wall portion of the housing 1 affording a fluid containing and annular clearance space 22 within the working chamber. At its inner end, the shaft head flange 21 terminates in the vicinity of the inner end of a reduced inside diameter portion of the tubular housing 1 affording a cylindrical damper surface 23 to which is opposed a cylindrical damper surface 24 of a damper sleeve 25 within the inner end portion of which the inner end portion of the coupling flange 21 of the shaft is telescopically received.

A corotational coupled relationship of the flange 21 and the sleeve 25 is provided by means of a splined key structure comprising an annular series of splines 27 on the outer inner end marginal surface of the flange 21 engaging with complementary longitudinally extending splines 28 on the inner cylindrical surface of the sleeve 25. By having the coupling splines of small tooth form and thus of large number on the relatively large diameter of the opposed coupling surfaces of the flange 21 and the sleeve 25, minimum backlash in damping mode is attained. In other words, any minimal slight backlash is reduced to minimum angle.

Viscous shear damping is attained by a shear film spaced relationship between the cylindrical working surfaces 23 and 24 in respect to a viscous damping fluid filling the shear film space. Thereby, relative torsional movement of the surfaces 23 and 24 is resisted by the viscous damping liquid by its tendency to shear in the film rather than a mere liquid drag relationship. This has been found quite effective in rotary or torsional dampers. While the inner end portion of the damper sleeve 25 is maintained concentric with the working surface 23 by the shaft flange 21 with substantial accuracy, the outer end portion of the sleeve is held concentric by suitable limited contact bearing means such as an annular series of substantially spaced small low friction bearing lugs 29 suitably comprising nylon pellets 29 seated in suitable sockets 30 provided in the outer end portion of the sleeve working surface 24 and in a desirable arrangement comprising about four in number.

By way of example, in an aircraft flutter damper, a silicone fluid which is commercially available as Dow-Corning fluid type 510 has been used. This silicone damping fluid has a viscosity of about 100,000 centistokes at 77° F. and affords in the damper a torque of about 100 inch-pounds at 1 rad./sec. This fluid is efficiently operative within a temperature range of from −65° F. to +165° F. However, because the silicone fluid is thixotropic and its viscosity varies with shear rate and at least to some extent with temperature variations, means are provided to compensate for such variations and maintain the damping function of the damper substantially constant throughout the temperature range.

According to the present invention, temperature compensation is effected by proportionally varying the shear area with the damper, namely the shear film spacing area between the working surfaces 23 and 24. To this end, means are provided for temperature responsively shifting the damper sleeve 25 axially within the working chamber and more particularly effecting relative axial adjustment between the working surfaces 23 and 24 as permitted by the longitudinally slidably splined coupling between the shaft flange 21 and the sleeve 25 wherein the splines 28 on the sleeve extend substantially throughout the length of the inner cylindrical surface of the sleeve 25.

Automatic responsive adjustment of the sleeve 25 is desirably effected by means of the bi-metallic device comprising in an efficient arrangement a stack of Bellville washers 31. One end of the stack thrusts against an inwardly directed annular flange 32 providing a thrust head on the inner end of a thrust sleeve 33 within which the bi-metallic washer stack is housed. This sleeve is provided at its opposite end with an annular fixedly attached radially outwardly extending flange 34 providing a thrust bearing shoulder for an annular anti-friction bearing assembly 35 comprising roller bearings against which thrusts a ring flange 37 extending radially inwardly on the inner end portion of the damper sleeve 25 under bias of a helical compression spring 38 seated at its outer end against the flange 37 and at its inner end against the head portion 20 of the damper shaft within the centering cup afforded by the flange 21. Through this arrangement, there is a normal spring bias load on the bi-metallic washer stack tending normally to thrust it toward the collapsed condition which it assumes at the high temperature end of the temperature range, expanding as the temperature drops and thus moving the shoulder 32 and the cylinder sleeve 33 and thereby the working sleeve 25 to reduce the shear film area.

At its outer end, the bi-metallic washer stack 31 thrusts against a fixed abutment on the housing, herein comprising an end cap closure member 39 suitably secured as by means of a threaded interconnection into the end portion of the housing tube 1 adjacent the outer end of cylindrical working surface 23 and carrying a ring seal 40 in its periphery against escape of damping fluid from within the working chamber of the damper. Through this arrangement, any temperature responsive changes in the length of the bi-metallic ring stack 31 is reflected in a change in axial position of the damper sleeve 25. In the full line position illustrated, the sleeve 25 is shown at substantially its limit of maximum shear film coupling relationship to the working surface 23 of the housing as assumed at the higher end of the temperature range for which this damper has been calculated and with the consequent viscosity of the damping fluid at its lowest and the damper thus benefiting from maximum shear film damping area. An intermediate dot dash position of the damping sleeve 25 indicates a cooler working temperature condition, since the bi-metallic ring stack is expansible on cooling. It will be understood that as the temperature drops and the viscosity of the damping fluid correspondingly increases, the bi-metallic ring or washer stack progressively expands and drives the damping sleeve 25 progressively into the clearance chamber portion 22 and reduces the shear film coupling area for maintaining substantially uniform damping function of the damper. Minor corrections in temperature compensation may be accomplished by slight changes in fluid gap such as by tapering either of the damper surfaces 23 or 24, for extremely critical requirements. For example, at the inner end of the working surface 23, a bellmouth bevel 41 is shown, which in this instance is of substantial flaring angle, but may be adjusted in angularity as desired or required.

Since maximum efficiency requires that the shear film spacing between the working surfaces 23 and 24 be constantly filled, means are provided for maintaining a filled fluid system within the damper. Desirably this is accomplished by providing a pressure loaded damping fluid reservoir which will also accommodate thermal expansion characteristics of the damping fluid and thus variations in fluid volume within the unit. To this end, a central reservoir tube 42 is secured as by means of welding 43 within a central bore 44 in the end cap 39 and projects into the working chamber of the damper unit as far as practicable, with its inner end adjacent in spaced relation to the shaft head portion 20, with the thrust flange 32 in slightly spaced relation about the perimeter of the tube, and the bi-metallic washer stack 31 mounted in guided relation about the tube. Reciprocably slidable within the reservoir tube 42 is a replenishing piston 45 having a reduced diameter stem 47 projecting slidably outwardly through a ring nut 48 threaded into an outer end counterbore in the tube bore 44. Leakage past the piston 45 is prevented by a sealing ring 49 mounted in its periphery and engaging the inner cylindrical wall of the reservoir tube 42.

Filling of the damper with damping fluid is effected through a longitudinally extending bore 50 through the stem 47 and the piston 45 past a check valve assembly 51 adjacent to the piston. Normally the piston 45 is biased inwardly as by means of a helical compression spring 52 thrusting between the piston and the closure nut 48. As the unit fills with the damping fluid, the piston 45 is forced outwardly in the reservoir tube 42 and by projection of the stem 47 is visual indication of the state of fluid fill. This is also desirable to show whether there may have been fluid loss due to leakage by observing the position of the stem 47 as a gauge stick. Normally an intermediate position of the piston 45 in the reservoir tube 42 is preferred in the filled condition of the unit, and this affords a substantial range of outward movement of the piston responsive to thermal expansion and thus increase in fluid volume, with the piston backing off in opposition to its spring bias. On the other hand, the biasing spring 52 assures that there is always a moderate replenishing pressure on the damping fluid within the unit.

Under filling pressure and under the biased thrust of the piston 45, damping fluid is forced to escape from within the chamber area defined within the shaft sleeve 21 and the damper sleeve 25, passing through the inside of the bi-metallic washer housing tube 33 and the thrust flange 32, as well as through the spline coupling 27, 28 and the roller bearings 35. Air is evacuated from within the unit through one or more bleed-off ports 53, closed after filling of the unit by suitable plug 54. A suitable plug 55 is employed to close the outer end of the filler passage bore 50 in the stem 47.

It will be understood that modifications and variations may be effected without departing from the scope of the novel concepts of the present invention.

I claim as my invention:

1. A viscous shear rotary damper unit comprising a housing,
   a shaft rotatably mounted in said housing,
   a shear film working surface stationary in said housing,
   a member torsionally related to said stationary working surface and affording a complementary working surface in shear film spaced relation to said stationary working surface,
   means mechanically coupling said member and said shaft for relative axial adjustment movement of said member with respect to said shaft and to said fixed working surface,
   and means for automatically adjusting said member to vary the area of opposition of said working surfaces as a function of temperature.

2. A viscous shear rotary damper unit comprising a housing having means for attaching it to one portion of associated apparatus,
   a rotary shaft extending from said housing and adapted to be attached to another portion of the associated apparatus,
   said housing defining a chamber for viscous damping fluid,
   a cylindrical damper surface fixed within the housing and concentric with the shaft,
   a cylindrical damper member having a complementary cylindrical surface disposed in shear film spaced relation to said fixed surface,
   means providing a corotational but axially adjustable coupling between the shaft and said cylindrical damper member,
   and thermally responsive means operative to adjust the cylindrical member axially relative to the shaft and to the fixed surface to vary the area of fluid in shear between these surfaces as a function of temperature.

3. A damper as defined in claim 2, wherein said adjustable coupling comprises axial splines.

4. A damper as defined in claim 2, wherein said thermally responsive means comprises a bimetallic disk stack thrusting at one end against a fixed abutment within the housing and having abutment means against which the opposite end of the stack thrusts and which abutment means are connected to said cylindrical member.

5. A viscous shear rotary damper comprising a housing including a tubular member having end closures at opposite ends and external means for attachment to associated apparatus,
   a shaft journalled through one of said end closures coaxially with respect to said tubular housing member and having means on its outer end for attachment to a part of the apparatus to be damped,
   said tubular housing member having a cylindrical damper surface adjacent to the other of said end closures,
   a cylindrical damper sleeve having an outside diameter complementary to said cylindrical damper surface to be in shear film spaced relation telescopically therein,
   means maintaining said shear film spaced relation,
   a cylindrical flange projecting inwardly on said shaft and telescoped within said sleeve,
   splines coupling said flange and sleeve for axial adjustment movements of the sleeve,
   said sleeve having a radially inwardly projecting flange adjacent to its end remote from said shaft flange,
   a helical biasing spring thrusting at one end against said shaft within said shaft flange and at its opposite end against said flange on the sleeve,
   a tubular member within said sleeve and having a radially outwardly extending flange opposing said sleeve flange on the opposite side from said spring,
   anti-friction bearing means between said tubular member flange and said sleeve flange,
   and a bi-metallic disk stack thrusting at one end against an abutment provided by said other end closure member and at its opposite end thrusting against an abutment provided by said tubular member,
   said spring maintaining pressure biasing said stack toward collapsed position wherein said working surfaces are in maximum opposed fluid shear area and said stack on thermally responsive expansion thrusting said tubular member and thereby said sleeve in opposition to said spring to reduce the area of fluid shearing opposition of the working surfaces by axially shifting the sleeve toward the shaft.

6. A viscous shear rotary damper comprising a housing including a tubular member having end closures at opposite ends and external means for attachment to associated apparatus,
   a shaft journalled through one of said end closures coaxially with respect to said tubular housing member and having means on its outer end for attachment to a part of the apparatus to be damped,
   said tubular housing member having a cylindrical damper surface adjacent to the other of said end closures,
   a cylindrical damper sleeve having an outside diameter complementary to said cylindrical damper surface to be in shear film spaced relation telescopically therein,
   means maintaining said shear film spaced relation,
   a cylindrical flange projecting inwardly on said shaft and telescoped within said sleeve,
   splines coupling said flange and sleeve for axial adjustment movements of the sleeve,
   said sleeve having a radially inwardly projecting flange adjacent to its end remote from said shaft flange,
   a helical biasing spring thrusting at one end against said shaft within said shaft flange and at its opposite end against said flange on the sleeve,
   a tubular member within said sleeve and having a radially outwardly extending flange opposing said sleeve flange on the opposite side from said spring, anti-friction bearing means between said tubular member flange and said sleeve flange, a bi-metallic disk stack thrusting at one end against an abutment provided by said other end closure member and at its opposite end thrusting against an abutment provided by said tubular member, said spring maintaining pressure biasing said stack toward collapsed position wherein said working surfaces are in maximum opposed fluid shear area and said stack on thermally responsive expansion thrusting said tubular member and thereby said sleeve in opposition to said spring to reduce the area of fluid shearing opposition of the working surfaces by axially shifting the sleeve toward the shaft, and means for filling the unit with viscous damping fluid including means extending through said other of said end closure members.

7. A damper as defined in claim 6, wherein said filling means comprise a reservoir tube secured to and projecting from said other end closure through said disk stack and tubular member and into said shaft flange, and a filler stem projecting outwardly from said other closure member and having a piston slidable in said reservoir tube.

8. A viscous shear rotary damper unit comprising a housing having means for attaching it to one portion of associated apparatus, a rotary shaft extending from said housing and adapted to be attached to another portion of the associated apparatus, said housing defining a chamber for viscous damping fluid, a cylindrical damper surface fixed within the housing and concentric with the shaft, a cylindrical damper member having a complementary cylindrical surface disposed in shear film spaced relation to said fixed surface, anti-friction bearing means maintaining said spaced relation between the damper member and said cylindrical surface, means providing a corotational but axially adjustable coupling between the shaft and said cylindrical damper member, and means operative to adjust the cylindrical member axially relative to the shaft and to the fixed surface to vary the area of fluid in shear between said surfaces as a function of temperature.

References Cited by the Examiner

UNITED STATES PATENTS

| | | | |
|---|---|---|---|
| 2,532,656 | 12/1950 | Backus et al. | 188—90 |
| 2,984,114 | 5/1961 | Bostwick et al. | 188—100 |
| 3,090,559 | 5/1963 | Bayer | 236—12 |
| 3,145,056 | 8/1964 | Blahnik | 267—34 X |

MILTON BUCHLER, *Primary Examiner.*

ARTHUR L. LA POINT, *Examiner.*